US006765966B2

(12) United States Patent
Vince

(10) Patent No.: US 6,765,966 B2
(45) Date of Patent: Jul. 20, 2004

(54) METHODS AND APPARATUS FOR RE-ENCODING A HIGH DEFINITION TELEVISION SIGNAL TO CREATE A STANDARD DEFINITION TELEVISION SIGNAL

(75) Inventor: Lawrence D. Vince, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 680 days.

(21) Appl. No.: 09/741,134

(22) Filed: Dec. 19, 2000

(65) Prior Publication Data

US 2002/0075954 A1 Jun. 20, 2002

(51) Int. Cl.[7] .............................................. H04B 1/66
(52) U.S. Cl. .............................. 375/240.26; 348/423.1; 375/240.1
(58) Field of Search ........................ 375/240.01, 240.02, 375/240.26, 240.27; 348/385.1, 386.1, 423.1, 432.1, 441, 445, 446; 386/111; 725/142; H04B 1/66

(56) References Cited

U.S. PATENT DOCUMENTS

| | | | |
|---|---|---|---|
| 5,446,498 A | | 8/1995 | Boon |
| 5,587,742 A | | 12/1996 | Hau et al. |
| 5,897,219 A | * | 4/1999 | Yoo et al. ................... 386/111 |
| 6,081,297 A | | 6/2000 | Lee |
| 6,130,708 A | | 10/2000 | Kitagawa et al. |
| 6,532,593 B1 | * | 3/2003 | Moroney ..................... 725/142 |
| 2002/0001343 A1 | * | 1/2002 | Challapali et al. ..... 375/240.01 |

OTHER PUBLICATIONS

Bhatt, B.; Birks, D.; Hermreck, D.; Digital television: making it work, Spectrum, IEEE, vol.: 34 Issue: 10, Oct. 1997 Page(s): 19–28.*

Basoglu, C.; Woobin Lee; O'Donnell, J.; The Equator MAP–CA/spl trade/DSP: an end–to–end broadband signal processor/spl trade/VLIW; Circuits and Systems for Video Technology, IEEE Transactions on, vol.: 12 Issue: 8, Aug. 2002 ;Page(s): 646–659.*

Fu, H.C.; Chen, Z.H.; Xu, Y.Y.; Wang, C.H.; A neural network based transcoder for MPEG2 video compression; Acoustics, Speech, and Signal Processing, 1999. ICASSP '99. Proceedings., 1999 IEEE International Conference on, vol.: 2, Mar. 15–19, 1999, p. 1125–1128.*

* cited by examiner

Primary Examiner—Tung T. Vo
(74) Attorney, Agent, or Firm—Barry R. Lipsitz; Douglas M. McAllister

(57) ABSTRACT

A method and apparatus for detecting a high definition television signal (e.g., a high definition MPEG2 data stream) and re-encoding the high definition signal to create a standard definition television signal. In particular, the apparatus involves re-encoding a copy of the high definition (HD) signal into a standard definition (SD) signal and combining both the original signal and the re-encoded standard definition signal into a multiplexed signal. The provision of both an SD signal and an HD signal in the multiplexed signal enables both SD television receivers and HD television receivers to receive content initially provided as an HD signal. The re-encoding may be performed, for example, at a cable television system headend. The HD television signal may contain one or more television services (channels). The apparatus enables backward compatibility between an HD data stream and SD receivers. Legacy SD equipment and new HD equipment can be supported using the same television signal feed. Re-encoding is performed only when necessary and with minimal impact to the television subscriber and the cable system.

18 Claims, 2 Drawing Sheets

METHODS AND APPARATUS FOR RE-ENCODING A HIGH DEFINITION TELEVISION SIGNAL TO CREATE A STANDARD DEFINITION TELEVISION SIGNAL

BACKGROUND OF THE INVENTION

The present invention relates to television signals. In particular, the present invention provides methods and apparatus for detecting a high definition television signal and re-encoding the high definition signal to create a standard definition television signal. More particularly, the invention involves re-encoding a copy of the high definition (HD) signal into a standard definition (SD) signal and combining both the original HD signal and the re-encoded SD signal into a multiplexed signal. The provision of both an SD signal and an HD signal in the multiplexed signal enables both SD and HD television receivers to receive content initially provided as a high definition signal. The re-encoding may be performed, for example, at a cable television system headend.

There are currently over six million digital television receivers in use that cannot receive a high definition television signal, such as a high definition MPEG2 data stream. No method currently exists to dynamically address the necessary resolution change at a cable television headend to enable an SD television receiver to receive HD signals.

It would be advantageous to provide a method and apparatus which re-encodes an HD signal into an SD signal for receipt by an SD digital receiver. It would be further advantageous to multiplex the re-encoded SD signal with the original HD signal so that the multiplexed signal could be broadcast without regard to the type of receiver that will be receiving the signal, thereby enabling backward compatibility between an HD data stream and SD receivers.

It would be even further advantageous to resolve conflicts in the protocol data of the HD and SD signals. It would be still further advantageous to enable a cable television system headend to support legacy SD equipment and new HD equipment using the same television signal feed. It would also be advantageous to provide for re-encoding only when necessary and with minimal impact to a subscriber or the television system when a channel transitions between HD and SD.

The methods and apparatus of the present invention provide the aforesaid and other advantages.

SUMMARY OF THE INVENTION

The present invention relates to methods and apparatus for detecting an HD television signal (e.g., a high definition MPEG2 data stream) and re-encoding the HD signal to create an SD television signal. In particular, the invention involves re-encoding a copy of the HD signal into an SD signal and combining both the original HD signal and the re-encoded SD signal into a multiplexed signal. The provision of both an SD signal and an HD signal in the multiplexed signal enables both SD television receivers and HD television receivers to receive content initially provided as a high definition signal. The re-encoding may be performed, for example, at a cable television system headend. The high definition television signal may contain one or more television services (channels).

The invention enables backward compatibility between a high definition data stream and standard definition receivers.

In a preferred embodiment of the invention, an incoming television signal is demodulated at a demodulator. The demodulated signal is split at a splitter into a first signal and a second signal, the first and second signals being substantially identical. A decoder determines whether the second signal is an HD signal and in the event that it is an HD signal, decodes it. The decoded HD signal is re-scaled at a re-scaler into SD signal format. The re-scaled HD signal is re-encoded at an encoder as an SD signal. A multiplexer multiplexes the re-scaled and re-encoded second signal with the first signal to create a multiplexed signal having two versions of the original signal, such that when the incoming television signal is an HD signal, the multiplexed signal will contain an HD version and an SD version of the incoming television signal.

The incoming television signal may contain one or more television services carried in an MPEG2 data stream or the like.

In an alternate embodiment, the protocol data may be extracted from at least one of the first signal and the second signal (e.g., by a processor in conjunction with the splitter). The extracted protocol data may be redefined to eliminate any conflicts between the protocol data of the first signal and the protocol data of the second signal. The redefined protocol data may then be inserted into the multiplexed data stream.

Where the second signal is an SD signal, no re-encoding will take place. The re-defined protocol data of the second signal may point to television services carried by the first signal and the second signal.

The protocol data may include source identifiers. In such an instance redefining the protocol data may include redefining the source identifiers.

The protocol data may comprise a Program Association Table (PAT) which provides correspondence between a program number and a program identifier (PID) of the signal. The protocol data may also comprise a Program Map Table (PMT) which provides mapping between the program number and program elements. Where the protocol data includes a PAT and a PMT, redefining the protocol data may include redefining the PAT and/or redefining the PMT.

The protocol data may comprise program service information protocol data (PSIP). The PSIP data may include source identifiers, program numbers, virtual channel tables, master guide tables, event information tables, extended text tables, and the like.

In an alternate embodiment, the multiplexed signal may be encrypted by an optional encryption device.

DETAILED DESCRIPTION OF THE INVENTION

Figure 1:
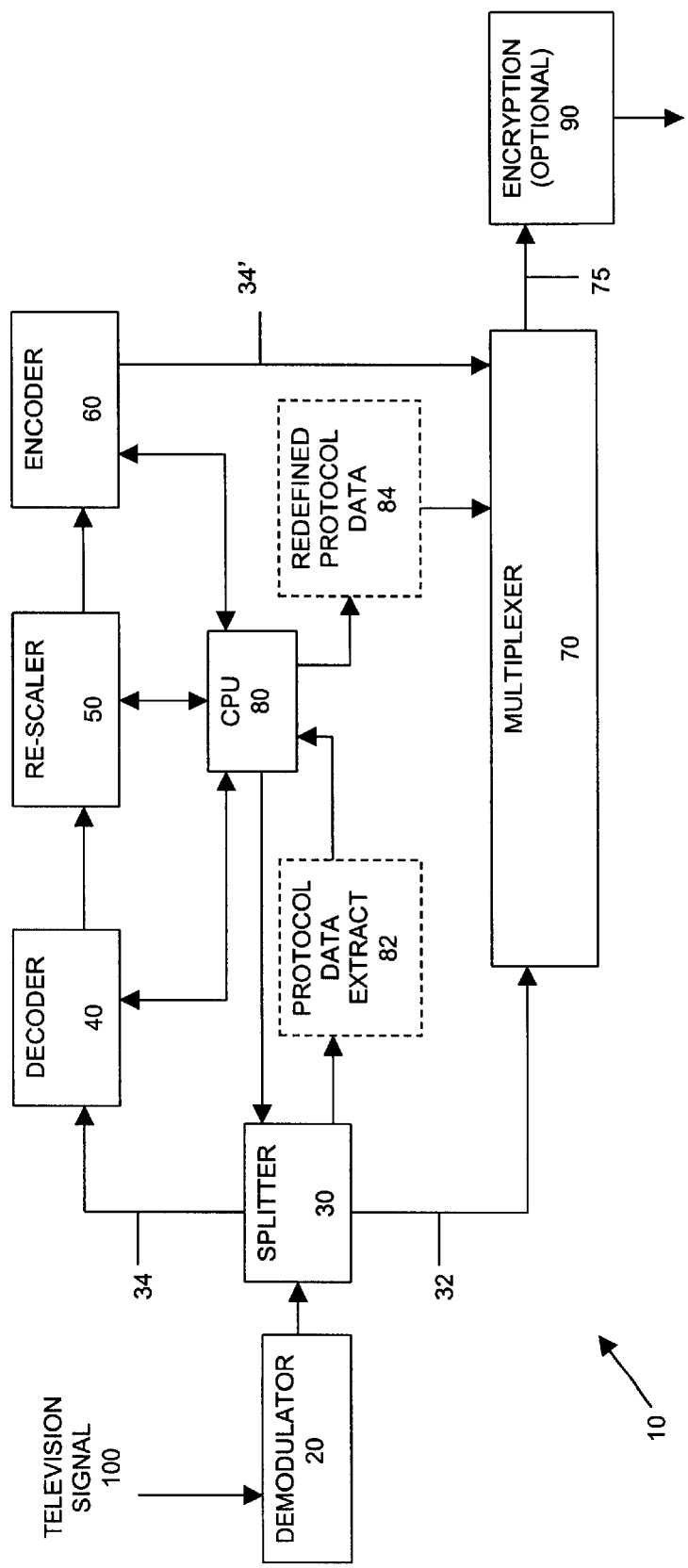
FIG. 1 is a block diagram of an example embodiment of the invention.

The invention provides methods and apparatus for re-encoding a high definition television signal into a standard definition television signal as shown in FIG. 1. In a preferred embodiment of the invention, an incoming television signal 100 is demodulated at a demodulator 20 of a partial re-encoding transcoder generally designated 10. The demodulated signal is split at a splitter 30 into a first signal 32 and a second signal 34, the first signal 32 being substantially identical to the second signal 34. A decoder 40 determines whether the second signal 34 is an HD signal and in the event that it is an HD signal, decodes it. The decoded HD signal is re-scaled at a re-scaler 50 into SD signal format. The re-scaled HD signal is re-encoded at an encoder 60 as an SD signal. A multiplexer 70 multiplexes the re-scaled and re-encoded second signal 34' with the first signal 32 to create a multiplexed signal 75 having two versions of the original signal 100, such that when the incoming television signal 100 is an HD signal, the multiplexed signal 75 will contain an HD version and an SD version of the incoming television signal 100. The encoder 60 is required to use only as many bits as are available in the multiplexed signal 75.

The incoming television signal 100 may contain one or more television services carried in an MPEG2 data stream or the like.

In an alternate embodiment, protocol data may be extracted from at least one of the first signal 32 and the second signal 34 (e.g., by a processor 80 in conjunction with splitter 30). The extracted protocol data (indicated at 82) may be redefined by the processor 80 to eliminate any conflicts between the protocol data of the first signal 32 and the protocol data of the second signal 34. The redefined protocol data (indicated at 84) may then be inserted into the multiplexed data stream at the multiplexer 70. A detailed discussion of the resolution of conflicts in protocol data can be found in commonly owned U.S. patent application Ser. No. 09/591,974, Apparatus and Methods for Resolution of Conflicts in Protocol Data of Multiple Data Streams, filed on Jun. 12, 2000.

Where the second signal 34 is an SD signal, no re-encoding will take place. The re-defined protocol data of the second signal 34 may point to television services carried by the first signal 32 and the television services carried by the second signal 34.

The protocol data may include source identifiers. In such an instance, redefining the protocol data may include redefining the source identifiers.

The protocol data may comprise a Program Association Table (PAT) which provides correspondence between a program number and a program identifier (PID) of the signal. The protocol data may also comprise a Program Map Table (PMT) which provides mapping between the program number and program elements. Where the protocol data includes a PAT and a PMT, redefining the protocol data may include redefining the PAT and/or redefining the PMT.

No new protocol data is added in this redefining process. The redefined protocol data is merely an intelligent duplication of the extracted protocol data content such that conflicts between the protocol data of the first signal 32 and the protocol data of the second signal 34 are eliminated. However, a separate source identifier and unique entries in the PAT and/or PMT may be required after the redefining process.

The protocol data may comprise program service information protocol data (PSIP). The PSIP data may include source identifiers, program numbers, virtual channel tables, master guide tables, event information tables, extended text tables, and the like.

In an alternate embodiment, the multiplexed signal may be encrypted by an optional encryption device 90.

Figure 2:
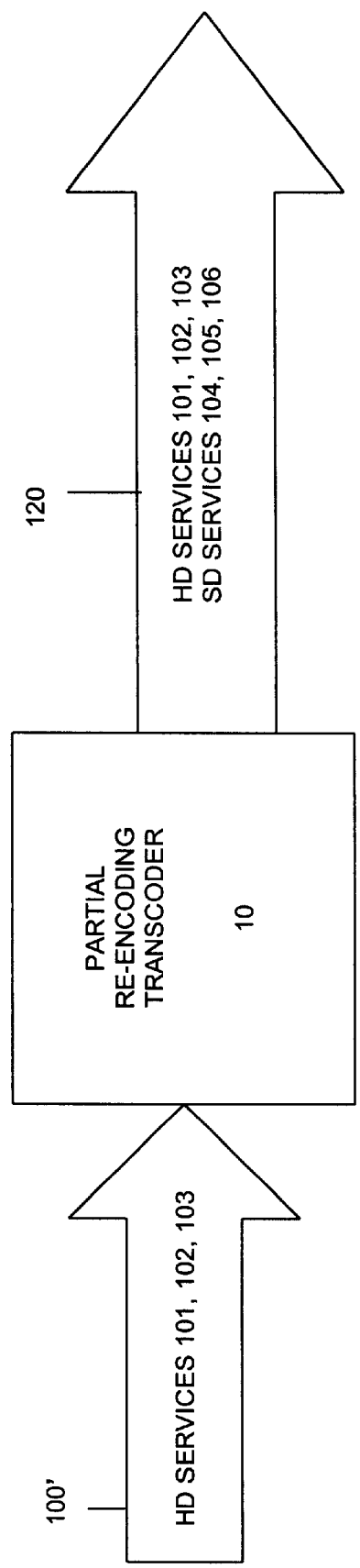
FIG. 2 is a flow diagram illustrating an example embodiment of the invention.

FIG. 2 illustrates an example of the re-encoding process. An inbound high definition television signal 100' containing high definition (HD) television services 101, 102, and 103 is received at a partial re-encoding transcoder 10 located, e.g., in a cable television system headend. The partial re-encoding transcoder 10 re-encodes the inbound HD signal 100 as discussed in connection with FIG. 1 above to produce an outbound multiplex 120 containing HD services 101, 102 and 103, as well as SD services 104, 105, and 106. The SD services 104, 105, and 106 correspond to the HD services 101, 102, and 103 respectively.

The example shown in FIG. 2 utilizes an inbound signal 100' containing three services 101, 102, and 103. The number of services is used for purposes of providing an example only. The invention may be used to re-encode any number of services contained within an inbound signal.

In addition, the invention can be used where the inbound signal 100' is not an HD signal. In the event that the inbound signal 100' is not a HD signal, and services 101, 102, and 103 are not HD services, the partial re-encoding transcoder 10 will still provide services 101, 102, 103, 104, 105, and 106 in the outbound multiplex. However, in such a case, the services 101, 102, and 103 will be identical to the services 104, 105, and 106 respectively. In such a case, the processor 80 of FIG. 1 may re-map the protocol data of services 104, 105, and 106 to point to services 101, 102, and 103 respectively.

The partial re-encoding transcoder 10 may be a device external to the Master Program Scheduler at a cable television headend, or may be a provided as a circuit board or series of circuit boards integrated into the Master Program Scheduler.

It should now be appreciated that the invention provides an advantageous means of re-encoding an HD television signal into an SD signal for receipt by a SD digital receiver. In particular, the invention provides for multiplexing of the re-encoded SD signal with the original HD signal, which enables the multiplexed signal to be broadcast without regard to the type of receiver that will be receiving the signal. Backward compatibility between an HD data stream and SD receivers is thereby provided. Using the invention, a cable television system headend will be able to support legacy SD equipment and new HD equipment using the same television signal feed. Re-encoding is performed only when necessary and with minimal impact to the television subscriber and the cable system.

Although the invention has been described in connection with various illustrated embodiments, numerous modifications and adaptations may be made thereto without departing from the spirit and scope of the invention as set forth in the claims.

What is claimed is:

1. A method for re-encoding a high definition television (HD) signal into a standard definition television (SD) signal, comprising the steps of:

demodulating an incoming television signal;

splitting the demodulated signal into a first signal and a second signal, said signals being substantially identical;

determining whether the second signal is an HD signal;

decoding the second signal in the event that it is an HD signal;

re-scaling the decoded HD signal into SD signal format;

re-encoding the re-scaled HD signal as an SD signal;

multiplexing the second signal with the first signal to create a multiplexed signal having two versions of the original signal; wherein, in the event the incoming signal is an HD signal, the multiplexed signal will contain an HD version and an SD version of the incoming signal.

2. A method in accordance with claim 1, wherein the incoming television signal contains one or more television services.

3. A method in accordance with claim 1, wherein the television signal comprises an MPEG2 data stream.

4. A method in accordance with claim 1, further comprising the steps of:
- extracting protocol data from at least one of the first signal and the second signal;
- redefining the protocol data of at least one of the first signal and the second signal to eliminate any conflicts therein; and
- inserting the redefined protocol data into the multiplexed data stream.

5. A method in accordance with claim 4, wherein:
the second signal is an SD signal; and
re-defined protocol data of the second signal points to television services carried by the first signal and the second signal.

6. A method in accordance with claim 4, wherein:
the protocol data includes source identifiers; and
the step of redefining the protocol data includes redefining the source identifiers.

7. A method in accordance with claim 4, wherein:
the protocol data comprises:
- a Program Association Table (PAT) which provides correspondence between a program number and a program identifier (PID) of the signal; and
- a Program Map Table (PMT) which provides mapping between the program number and program elements; and the step of redefining the protocol data comprises the steps of:
- redefining the PAT; and
- redefining the PMT.

8. A method in accordance with claim 4, wherein the protocol data comprises program service information protocol data.

9. A method in accordance with claim 1, further comprising the step of encrypting the multiplexed signal.

10. Apparatus for re-encoding a high definition television (HD) signal into a standard definition television (SD) signal, comprising:
- a demodulator for demodulating an incoming television signal;
- a splitter for splitting the demodulated signal into a first signal and a second signal, said signals being substantially identical;
- a decoder for decoding the second signal in the event that it is an HD signal;
- a re-scaler for re-scaling the decoded HD signal into SD signal format;
- an encoder for re-encoding the re-scaled HD signal as an SD signal; and
- a multiplexer for multiplexing the second signal with the first signal to create a multiplexed signal having two versions of the original signal; wherein,
- in the event the incoming signal is an HD signal, the multiplexed signal will contain an HD version and an SD version of the incoming signal.

11. Apparatus in accordance with claim 10, wherein the incoming television signal contains one or more television services.

12. Apparatus in accordance with claim 10, wherein the television signal comprises an MPEG2 data stream.

13. Apparatus in accordance with claim 10, further comprising:
a processor, wherein said processor:
- extracts protocol data from at least one of the first signal and the second signal;
- redefines the protocol data of at least one of the first signal and the second signal to eliminate any conflicts therein; and
- inserts the redefined protocol data into the multiplexed data stream.

14. Apparatus in accordance with claim 13, wherein:
the second signal is an SD signal; and
re-defined protocol data of the second signal points to television services carried by first signal and the second signal.

15. Apparatus in accordance with claim 13, wherein:
the protocol data includes source identifiers; and
the step of redefining the protocol data includes redefining the source identifiers.

16. An apparatus in accordance with claim 13, wherein:
the protocol data comprises:
- a Program Association Table (PAT) which provides correspondence between a program number and a program identifier (PID) of the signal; and
- a Program Map Table (PMT) which provides mapping between the program number and program elements; and the step of redefining the protocol data comprises the steps of:
- redefining the PAT; and
- redefining the PMT.

17. An apparatus in accordance with claim 13, wherein the protocol data comprises program service information protocol data.

18. An apparatus in accordance with claim 10, further comprising:
an encryption device for encrypting the multiplexed signal.

* * * * *